US012165585B2

(12) United States Patent
Bong et al.

(10) Patent No.: US 12,165,585 B2
(45) Date of Patent: Dec. 10, 2024

(54) DISPLAY APPARATUS

(71) Applicant: LG Display Co., Ltd., Seoul (KR)

(72) Inventors: Junho Bong, Paju-si (KR); Minwoo Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/225,128

(22) Filed: Jul. 22, 2023

(65) Prior Publication Data

US 2023/0360604 A1 Nov. 9, 2023

Related U.S. Application Data

(63) Continuation of application No. 17/878,905, filed on Aug. 2, 2022, now Pat. No. 11,869,433.

(30) Foreign Application Priority Data

Aug. 3, 2021 (KR) ........................ 10-2021-0101890

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0426* (2013.01);
(Continued)

(58) Field of Classification Search
CPC ............... G09G 3/3233; G09G 3/3266; G09G 2300/0426; G09G 2300/0819;
(Continued)

(56) References Cited

U.S. PATENT DOCUMENTS 10,140,919 B2 11/2018 Nonaka et al.
10,636,356 B1 4/2020 Qian et al.
(Continued)

FOREIGN PATENT DOCUMENTS

CN 109119028 A 1/2019
CN 109727580 A 5/2019
(Continued)

OTHER PUBLICATIONS

Office Action dated Oct. 17, 2024 issued in corresponding Chinese Patent Application No. 202210916943.3.

*Primary Examiner* — Amare Mengistu
*Assistant Examiner* — Gloryvid Figueroa-Gibson
(74) *Attorney, Agent, or Firm* — Morgan, Lewis & Bockius LLP

(57) ABSTRACT

A pixel of a display apparatus includes a light emitting device and a pixel circuit connected to first to third gate control lines and the light emitting device, the pixel circuit including first to fourth nodes. The pixel circuit includes a driving transistor connected to the first to third nodes, a first transistor connected to the first gate control line and the first and second nodes, a second transistor connected to the second gate control line, the second node, and a first driving voltage line, a third transistor connected to the first gate control line, the third node, and the fourth node, a fourth transistor connected to the first gate control line, the fourth node, and an initialization voltage line, a fifth transistor connected to the third gate control line, the third node, and a data line, and a storage capacitor between the first node and the fourth node.

19 Claims, 10 Drawing Sheets

(52) U.S. Cl.
CPC ............... *G09G 2300/0819* (2013.01); *G09G 2300/0842* (2013.01); *G09G 2300/0861* (2013.01); *G09G 2310/08* (2013.01); *G09G 2320/0626* (2013.01)

(58) Field of Classification Search
CPC ... G09G 2300/0842; G09G 2300/0861; G09G 2310/08; G09G 2320/0626; G09G 2300/0417; G09G 2310/0216; G09G 2310/0251; G09G 3/3225; G09G 3/3275; G09G 2330/021
USPC .......................................................... 345/690
See application file for complete search history.

(56) References Cited

U.S. PATENT DOCUMENTS

| | | | | |
|---|---|---|---|---|
| 2019/0130843 | A1* | 5/2019 | Yu ...................... | H10K 59/1315 |
| 2020/0211452 | A1 | 7/2020 | Lee et al. | |
| 2021/0035499 | A1 | 2/2021 | Qian et al. | |
| 2021/0104196 | A1 | 4/2021 | Yuan | |
| 2021/0225974 | A1 | 7/2021 | Zeng et al. | |

FOREIGN PATENT DOCUMENTS

| | | | |
|---|---|---|---|
| CN | 110246454 | A | 9/2019 |
| CN | 111383591 | A | 7/2020 |
| CN | 112102785 | A | 12/2020 |
| KR | 10-2020-0071275 | A | 6/2020 |

* cited by examiner

DISPLAY APPARATUS

CROSS-REFERENCE TO RELATED APPLICATIONS

This application is a Continuation of co-pending U.S. patent application Ser. No. 17/878,905, filed on Aug. 2, 2022, which claims the benefit of the Korean Patent Application No. 10-2021-0101890, filed on Aug. 3, 2021. Each of the above prior U.S. and Korean patent applications is hereby incorporated by reference as if fully set forth herein.

BACKGROUND

Technical Field

The present disclosure relates to a pixel and a display apparatus including the same.

Discussion of the Related Art

As information technology advances, the market of display apparatuses which are connection mediums between users and information is increasing. In addition to letter-based information transfer between users, various types of communications are active. As the type of information is changed, the performance of display apparatuses displaying information is being enhanced. Therefore, the use of various types of display apparatuses such as organic light emitting display apparatuses, liquid crystal display (LCD) apparatuses, micro light emitting diode (LED) display apparatuses, and quantum dot (QD) display apparatuses is increasing.

In light emitting display apparatuses, pixels including a light emitting device and a driving transistor are arranged as a matrix type, and the luminance of an image displayed through the pixels is adjusted based on a gray level of image data. The driving transistor controls a driving current flowing in the light emitting device on the basis of a voltage applied between a gate electrode and a source electrode thereof. The amount of light emitted from the light emitting device is determined based on the driving current, and the luminance of an image is determined based on the amount of light emitted from the light emitting device.

For example, in the light emitting display apparatuses, when a gate signal and a data signal are supplied to a subpixel, the light emitting device of a selected subpixel may emit light, and thus, an image may be displayed. The light emitting device may be implemented based on an organic material or an inorganic material.

The light emitting display apparatuses display an image on the basis of light emitted from a light emitting device of a subpixel and thus have various advantages, but it is needed to enhance the accuracy of a pixel driving circuit controlling light emission of a subpixel, so as to enhance the quality of an image. For example, the accuracy of the pixel driving circuit may be enhanced by compensating for a threshold voltage of a driving transistor included in the pixel driving circuit.

The pixel driving circuit may further include a compensation circuit including a plurality of switching transistors and a capacitor, in addition to a driving transistor and a switching transistor for supplying a data voltage, and a plurality of scan signals for driving the compensation circuit may be supplied.

The above-described background is possessed by the inventor of the application for deriving the disclosure, or is technology information that has been acquired in deriving the disclosure. The above-described background is not necessarily known technology disclosed to the general public before the application of the disclosure.

SUMMARY

As resolution and power consumption of light emitting display apparatuses increase, driving technology for decreasing power consumption of light emitting display apparatuses is being developed. In order to reduce power consumption, pixels may be driven at a low frequency by lowering a frame rate during a specific period.

However, in order to enhance an image quality characteristic of low frequency driving, it is needed to increase the number of gate control signals for driving of a pixel compensation circuit, and due to this, a design area of a gate driving circuit generating and supplying the gate control signal increases, whereby it is difficult to implement a narrow bezel.

Moreover, there is a problem where an effect of decreasing power consumption is reduced due to toggling of a clock for generating a plurality of gate control signals in the gate driving circuit in low frequency driving.

Accordingly, embodiments of the present disclosure are directed to a providing a pixel and a display apparatus including the same that substantially obviates one or more of the problems due to limitations and disadvantages of the related art.

An aspect of the present disclosure is to provide a pixel and a display apparatus including the same, in which the number of gate control signals needed for a pixel driving circuit is reduced by sharing a gate control signal in adjacent horizontal lines, and thus, a narrow bezel is implemented and power consumption decreases.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a pixel comprises a light emitting device and a pixel circuit connected to first to third gate control lines and the light emitting device, the pixel circuit including first to fourth nodes, wherein the pixel circuit includes a driving transistor connected to the first to third nodes, a first transistor connected to the first gate control line and the first and second nodes, a second transistor connected to the second gate control line, the second node, and a first driving voltage line, a third transistor connected to the first gate control line, the third node, and the fourth node, a fourth transistor connected to the first gate control line, the fourth node, and an initialization voltage line, a fifth transistor connected to the third gate control line, the third node, and a data line, and a storage capacitor provided between the first node and the fourth node.

In another aspect, a display apparatus comprises a substrate including a display area, including a plurality of pixels arranged in a first direction and a second direction crossing the first direction, and a non-display area disposed near the display area and a gate driver disposed in the non-display area to supply a scan signal, a first emission control signal, and a second emission control signal to each of the plurality of pixels, wherein two pixels adjacent to each other in the second direction among the plurality of pixels share one or more of the first and second emission control signals.

In another aspect, a display apparatus comprises a substrate including a display area, including an $n^{th}$ pixel (where n is an odd number of 1 or more) and an $n+1^{th}$ pixel vertically adjacent to each other, and first and second non-display areas parallel to each other with the display area therebetween, a first gate driver supplying a first emission control signal to the $n^{th}$ pixel and the $n+1^{th}$ pixel in the first non-display area, and a second gate driver supplying a second emission control signal to the $n^{th}$ pixel and the $n+1^{th}$ pixel in the second non-display area, wherein each of the $n^{th}$ pixel and the $n+1^{th}$ pixel emits light on the basis of the first emission control signal and the second emission control signal.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure.

DETAILED DESCRIPTION

Figure 1:
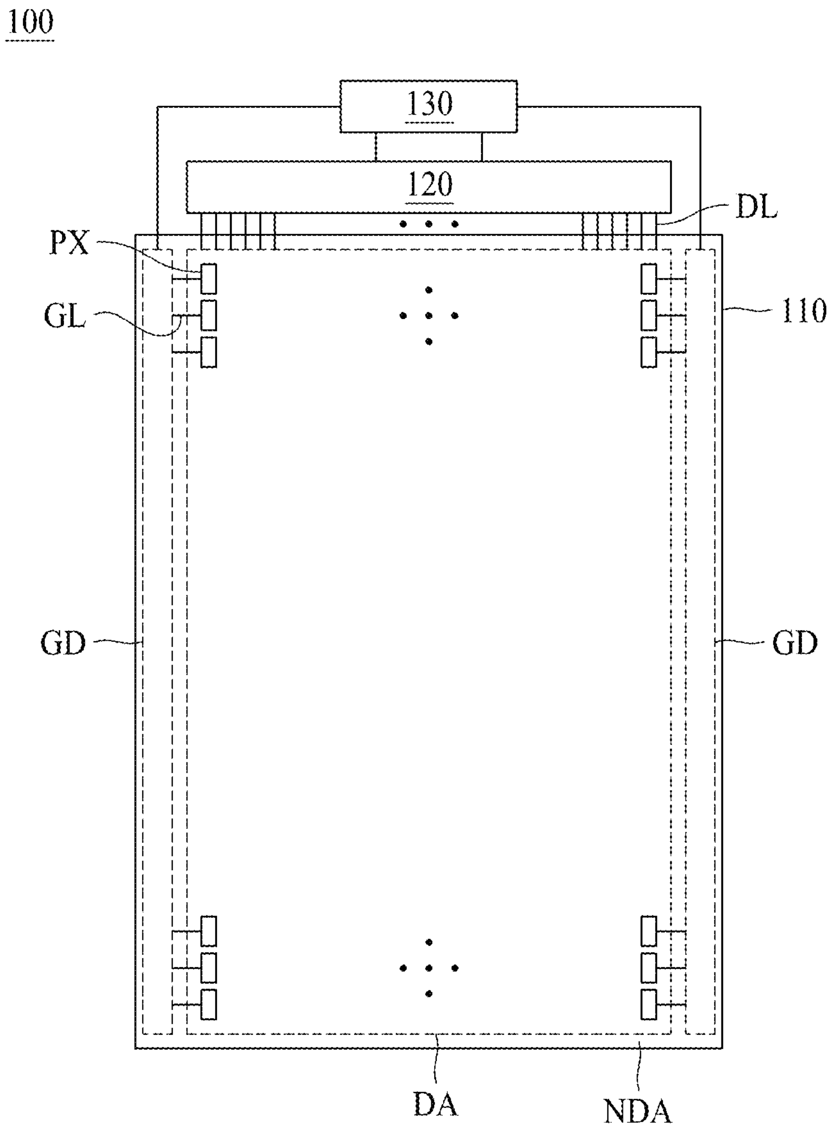
FIG. 1 is a block diagram of a display apparatus according to an embodiment of the present disclosure.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~%', 'above~', 'below~%', and 'next to~', one or more portions may be arranged between two other portions unless 'just' or 'direct' is used.

In describing a temporal relationship, for example, when the temporal order is described as "after," "subsequent," "next," and "before," a case which is not continuous may be included, unless "just" or "direct" is used.

It will be understood that, although the terms "first", "second", etc. may be used herein to describe various elements, these elements should not be limited by these terms. These terms are only used to partition one element from another. For example, a first element could be termed a second element, and, similarly, a second element could be termed a first element, without departing from the scope of the present invention.

The terms "first horizontal axis direction," "second horizontal axis direction," and "vertical axis direction" should not be interpreted only based on a geometrical relationship in which the respective directions are perpendicular to each other, and may be meant as directions having wider directivities within the range within which the components of the present disclosure can operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Herein, a pixel circuit and a gate driving circuit provided on a substrate of a display panel may be implemented with an N-type or P-type transistor. For example, the transistor may be implemented as a transistor having an N-type or P-type metal oxide semiconductor field effect transistor (MOSFET) structure. The transistor may be a three-electrode element including a gate electrode, a source electrode, and a drain electrode. The source electrode and the drain electrode of the transistor may not be fixed and may switch therebetween on the basis of a voltage applied thereto.

A gate signal of a transistor used as switching elements may swing between a gate-on voltage and a gate-off voltage. The gate-on voltage may be set to a voltage for turning on a transistor, and the gate-off voltage may be set to a voltage for turning off a transistor. In N-type transistors, the gate-on voltage may be a gate high voltage (VGH) having a first voltage level, and the gate-off voltage may be a gate low voltage (VGL) having a second voltage level which is lower than the gate high voltage (VGH). In P-type transistors, the gate-on voltage may be the gate low voltage (VGL) having the second voltage level, and the gate-off voltage may be the gate high voltage (VGH) having the first voltage level.

At least a first gate control line, a second gate control line, and a third grate control line may be provided between a gate driving circuit and a pixel circuit. A signal supplied to the first gate control line may be referred to as a first signal, a first gate signal, a first gate control signal, or a first emission control signal. Also, a signal supplied to the second gate control line may be referred to as a second signal, a second gate signal, a second gate control signal, or a second emission control signal. Also, a signal supplied to the third gate control line may be referred to as a third signal, a third gate signal, a third gate control signal, or a third emission control signal. In the following description, a signal supplied to the first gate control line may be referred to as a "first emission control signal", a signal supplied to the second gate control line may be referred to as a "second emission control signal", and a signal supplied to the third gate control line may be referred to as a "scan signal".

Hereinafter, a preferred embodiment of a pixel and a display apparatus including the same according to the present disclosure will be described in detail with reference to the accompanying drawings. Wherever possible, the same reference numbers will be used throughout the drawings to refer to the same or like parts. Since a scale of each of elements shown in the accompanying drawings is different from an actual scale for convenience of description, the present disclosure is not limited to the shown scale.

FIG. 1 is a block diagram of a display apparatus 100 according to an embodiment of the present disclosure.

With reference to FIG. 1, the display apparatus 100 according to an embodiment of the present disclosure may include a display panel 110, where a plurality of data lines DL and a plurality of gate lines GL are arranged and a plurality of pixels PX connected to the plurality of data lines DL and the plurality of gate lines GL are arranged, and a plurality of driving circuits which supply a driving signal to the display panel 110.

It is illustrated that the plurality of pixels PX are arranged as a matrix type to configure a pixel array, but embodiments of the present disclosure are not limited thereto and the plurality of pixels PX may be arranged as various types.

The driving circuit may include a data driving circuit 120 which supplies data signals to the plurality of data lines DL, a gate driving circuit GD which supplies a gate signal to the plurality of gate lines GL, and a controller 130 which controls the data driving circuit 120 and the gate driving circuit GD.

The display panel 110 may include a display area DA which displays an image and a non-display area NDA which is disposed near the display area DA. The plurality of pixels PX, the data lines DL transferring the data signals to the plurality of pixels PX, and the gate lines GL transferring the gate signal to the plurality of pixels PX may be arranged in the display area DA.

The plurality of gate lines GL disposed in the display area DA may extend up to the non-display area NDA and may be electrically connected to the gate driving circuit GD. The gate line GL may electrically connect the gate driving circuit GD to a plurality of pixels PX arranged in a first direction (or a row direction). Additionally, gate driving-related lines needed for generating various gate signals or driving the plurality of pixels PX by using the gate driving circuit GD may be arranged in the non-display area NDA. For example, the gate driving-related lines may include one or more high level gate voltage lines which transfer a high level gate voltage to the gate driving circuit GD, one or more low level gate voltage lines which transfer a low level gate voltage to the gate driving circuit GD, a plurality of clock lines which transfer a plurality of clock signals to the gate driving circuit GD, and one or more start lines which transfer one or more start signals to the gate driving circuit GD.

The plurality of data lines DL disposed in the display area DA may extend up to the non-display area NDA and may be electrically connected to the data driving circuit 120. The data line DL may electrically connect the data driving circuit 120 to a plurality of pixels PX which are arranged in a second direction (or a column direction) crossing the first direction and may be implemented as a single line, or may be implemented by connecting a plurality of lines through a contact hole by using a link line.

In the display panel 110, the plurality of data lines DL and the plurality of gate lines GL may be arranged along with the pixel array. As described above, the plurality of data lines DL and the plurality of gate lines GL may be arranged in row or column, and for convenience of description, it may be assumed that the plurality of data lines DL are arranged in column and the plurality of gate lines GL are arranged in row. However, embodiments of the present disclosure are not limited thereto.

The controller 130 may start data signal scan on the basis of a timing implemented in each frame, convert input video data input from the outside on the basis of a data signal format used in the data driving circuit 120 to output converted image data, and control the data driving circuit 120 at an appropriate time on the basis of scan.

The controller 130 may receive timing signals including a vertical synchronization signal, a horizontal synchronization signal, an input data enable signal, and a clock signal from the outside along with the input video data. The timing controller 130 may receive the timing signals to generate and output control signals for controlling the data driving circuit 120 and the gate driving circuit GD.

For example, the controller 130 may output various data control signals including a source start pulse, a source sampling clock, and a source output enable signal, for controlling the data driving circuit 120. The source start pulse may control a data sampling start timing of one or more data signal generating circuits configuring the data driving circuit 120. The source sampling clock may be a clock signal which controls a sampling timing of data in each data signal generating circuit. The source output enable signal may control an output timing of the data driving circuit 120.

Moreover, the controller 130 may output a gate control signal including a gate start pulse, a gate shift clock, and a gate output enable signal, for controlling the gate driving circuit GD. The gate start pulse may control an operation start timing of one or more gate signal generating circuits configuring the gate driving circuit GD. The gate shift clock may be a clock signal which is input to the one or more gate signal generating circuits in common and may control a shift timing of a scan signal. The gate output enable signal may designate timing information about the one or more gate signal generating circuits.

The controller 130 may be a timing controller used in general display apparatus technology, or may be a control device which further performs another control function, in addition to the timing controller.

The controller 130 may be implemented as a separate element which is independent of the data driving circuit 120, or the controller 130 and the data driving circuit 120 may be integrated and implemented as one integrated circuit (IC).

The data driving circuit 120 may be implemented to include one or more data signal generating circuits. The data signal generating circuit may include a shift register, a latch circuit, a digital-to-analog converter, and an output buffer. Depending on the case, the data signal generating circuit may further include an analog-to-digital converter.

The data signal generating circuit may be connected to a bonding pad of the display panel 110 by using a tape automated bonding (TAB) type, a chip-on glass (COG) type, or a chip-on panel (COP) type, or may be directly provided in the display panel 110 and may be integrated and disposed in the display panel 110. Also, a plurality of data signal generating circuits may be implemented as a chip-on film (COF) type where the data signal generating circuits are mounted on a source circuit film connected to the display panel 110.

The gate driving circuit GD may sequentially supply the gate signal to the plurality of gate lines GL to drive the plurality of pixels PX connected to the plurality of gate lines GL. The gate driving circuit GD may include a shift register and a level shifter.

The gate driving circuit GD may be connected to the bonding pad of the display panel 110 by using a TAB type, a COG type, or a COP type, or may be implemented as a gate-in panel (GIP) type and may be directly provided in the display panel 110. Also, a plurality of gate signal generating circuits may be implemented as a COF type where the gate signal generating circuits are mounted on a gate circuit film connected to the display panel 110. The gate driving circuit GD may include a plurality of gate signal generating circuits, and the plurality of gate signal generating circuits may be implemented as a GIP type and may be disposed in the non-display area NDA of the display panel 110.

The gate driving circuit GD may sequentially supply the plurality of gate lines GL with the gate signal which has a gate high voltage VGH having a first voltage level for turning on/off a transistor or a gate low voltage VGL having a second voltage level for turning on/off a transistor, on the basis of control by the controller 130. When a signal is supplied to a specific gate line by the gate driving circuit GD, the data driving circuit 120 may convert image data, received from the controller 130, into analog data signals and may supply the analog data signals to the plurality of data lines DL.

The data driving circuit 120 may be disposed at one side of the display panel 110. For example, the data driving circuit 120 may be disposed at an upper side, a lower side, a left side, or a right side of the display panel 110. Also, the data driving circuit 120 may be disposed at both sides of the display panel 110 on the basis of a driving type or a panel design type. For example, the data driving circuit 120 may be disposed at an upper side and a lower side or a left side and a right side of the display panel 110.

The gate driving circuit GD may be disposed at one side of the display panel 110. For example, the gate driving circuit GD may be disposed at the upper side, the lower side, the left side, or the right side of the display panel 110. Also, the gate driving circuit GD may be disposed at both sides of the display panel 110 on the basis of a driving type or a panel design type. For example, the gate driving circuit GD may be disposed at the upper side and the lower side or the left side and the right side of the display panel 110. The gate driving circuit GD may be formed in left and/or right non-display area(s) NDA of a substrate along with a process of manufacturing a thin film transistor (TFT) of the pixel PX and may operate based on a single feeding type to supply the gate signal to each of the plurality of gate lines GL. Alternatively, the gate driving circuit GD may be formed in each of the left and right non-display areas NDA of the substrate and may operate based on a double feeding type to supply the gate signal to each of the plurality of gate lines GL. Alternatively, the gate driving circuit GD may be formed in each of the left and right non-display areas NDA of the substrate and may operate based on an interlacing type to supply the gate signal to each of the plurality of gate lines GL.

An example is described where the plurality of gate lines GL are arranged in the first direction (or the row direction) and the plurality of pixels PX are arranged in the second direction (or the column direction) crossing the first direction in the display panel 110, and thus, the present disclosure is described on the assumption that the data driving circuit 120 is disposed at the upper side of the display panel 110 and the gate driving circuit GD is disposed at the left side and the right side of the display panel 110.

The plurality of gate lines GL disposed in the display panel 110 may include a plurality of first gate control lines, a plurality of second gate control lines, and a plurality of third gate control lines. The first gate control line, the second gate control line, and the third gate control line may be lines which transfer different kinds of gate signals to gate electrodes of different transistors. For example, the first gate control line may be a line which transfers a first emission control signal, the second gate control line may be a line which transfers a second emission control signal, and the third gate control line may be a line which transfers the scan signal.

Therefore, the gate driving circuit GD may include a plurality of first emission control driving circuits which output first emission control signals to the first gate control line of the gate line GL, a plurality of second emission control driving circuits which output second emission control signals to the second gate control line, and a plurality of scan driving circuits which output scan signals to the third gate control line.

A period, where data signals and the gate signal including the first and second emission control signals and the scan signal are scanned and applied to all pixels PX arranged in the second direction (or the column direction) in the display area DA each once, may be referred to as one frame period. One frame period may be divided into a scan period, where data of an input image is applied to the pixels PX through the gate lines GL connected to the pixels PX, and an emission period where the pixels PX emit light on the basis of the first and second emission control signals after the scan period. The scan period may include an initialization period and a sampling period. Also, the sampling period may include a programming period. During the scan period, nodes included in the pixel circuit may be initialized, a threshold voltage of the driving transistor may be compensated for, and a data voltage may be charged, and during the emission period, an emission operation may be performed. The scan period may merely be about several horizontal scan periods, and the most of one frame period may be occupied by the emission period.

Figure 2:
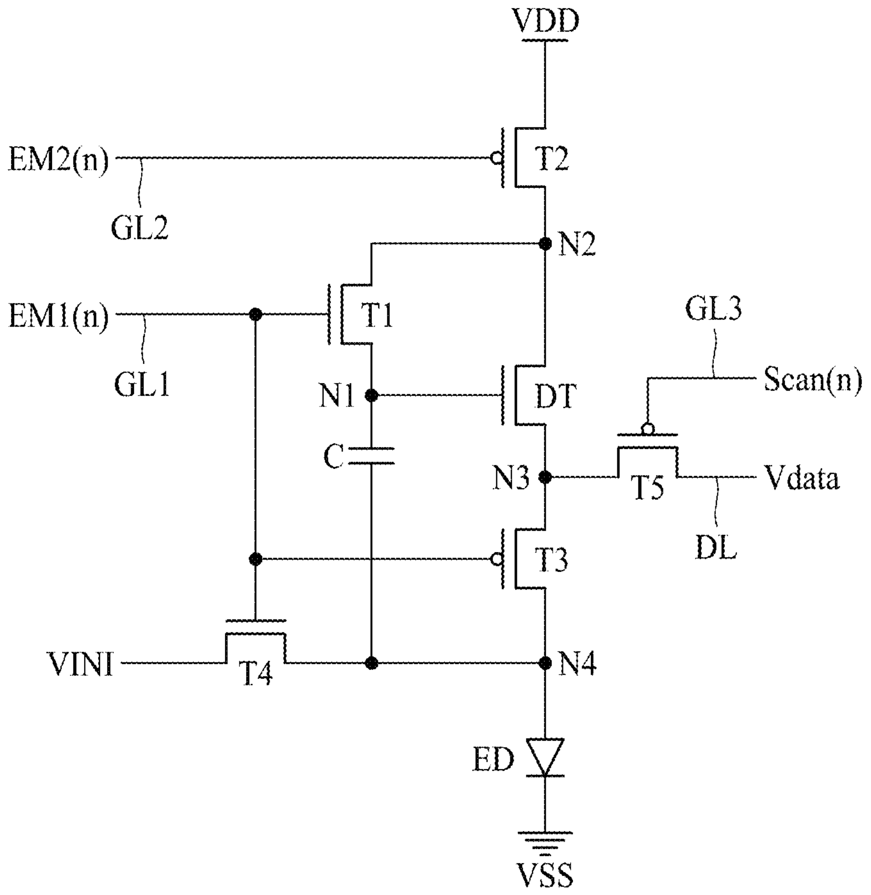
FIG. 2 is a circuit diagram of a pixel circuit and a light emitting device according to an embodiment of the present disclosure.

FIG. 2 is a circuit diagram of a pixel circuit and a light emitting device according to an embodiment of the present disclosure. The pixel circuit and the light emitting device illustrated in FIG. 2 represent one pixel illustrated in FIG. 1, and a pixel arranged in an $n^{th}$ horizontal line will be described below.

With reference to FIG. 2, a pixel circuit for transferring a driving current to a light emitting device ED may include a plurality of transistors and a capacitor and may be electrically connected to a first driving voltage VDD line, a second driving voltage VSS line, an initialization voltage VIM line, a first gate control line GL1, a second gate control line GL2, a third gate control line GL3, and a data line DL. The pixel circuit according to an embodiment of the present disclosure may be an internal compensation circuit for compensating for a threshold voltage of a driving transistor DT.

The light emitting device ED may be disposed between a first electrode (or an anode electrode) connected to the pixel circuit and a second electrode (or a cathode electrode) connected to the second driving voltage VSS line. The light emitting device ED according to an embodiment may include an organic light emitting unit, a quantum dot light emitting unit, or an inorganic light emitting unit, or may include a micro light emitting diode device. The light emitting device ED may emit light with a data voltage supplied from the pixel circuit.

The pixel circuit may include the driving transistor DT, five switching transistors T1 to T5, and one storage capacitor C. The pixel circuit may be supplied with a first driving voltage VDD which is a high level voltage, a second driving voltage VSS which is a low level voltage, and an initialization voltage VINI which is a source voltage, may be supplied with gate signals, which are a first emission control signal EM1(*n*), a second emission control signal EM2(*n*), and a scan signal Scan(n), through a gate driving circuit GD, and may be supplied with a data voltage Vdata through a data driving circuit 120. The first emission control signal EM1 (*n*), the second emission control signal EM2(*n*), and the scan signal Scan(n) may be gate signals applied to pixels arranged in the $n^{th}$ horizontal line.

The driving transistor DT may be a driving element which adjusts a current flowing in the light emitting device ED on the basis of a gate-source voltage Vgs thereof and may include a first node N1 connected to one side of the capacitor C, a second node N2 connected to the first transistor T1 and the second transistor T2, and a third node N3 connected to the third transistor T3 and the fifth transistor T5. The driving transistor DT may include a gate electrode connected to the first node N1, a drain electrode connected to the second node N2, and a source electrode connected to the third node N3.

When the first transistor T1 and the second transistor T2 are turned on, the driving transistor DT may store the first driving voltage VDD in the first node N1 which is the gate electrode thereof. Also, when the data voltage Vdata is supplied in a state where the first transistor T1 is turned on, the data voltage Vdata may be applied to the first node N1 through a diode-connection. Also, the driving transistor DT may supply the driving current to the light emitting device ED on the basis of the first emission control signal EM1(*n*) and the second emission control signal EM2(*n*) to adjust the luminance of the light emitting device ED, on the basis of the amount of current.

The first transistor T1 may be connected to the first gate control line GL1, the first node N1, and the second node N2 and may be turned on or off by the first emission control signal EM1(*n*) through the first gate control line GL1. For example, the first transistor T1 may be a TFT having a first conductive type (or an N type), and when the first emission control signal EM1(*n*) is the gate high voltage VGH having the first voltage level, the first transistor T1 may be turned on. Also, when the first emission control signal EM1(*n*) is the gate low voltage VGL having the second voltage level, the first transistor T1 may be turned off.

Therefore, when the first emission control signal EM1(*n*) is the gate high voltage VGH, the first transistor T1 may be turned on and may transfer, to the first node N1, a sampled voltage of the driving transistor DT or the first driving voltage VDD which is a high level voltage of the second node N2, and thus, may initialize the data voltage Vdata applied to the light emitting device ED or may apply the data voltage Vdata to sample a threshold voltage Vth of the driving transistor DT.

The second transistor T2 may be connected to the second gate control line GL2, the second node N2, and the first driving voltage VDD line and may be turned on or off by the second emission control signal EM2(*n*) through the second gate control line GL2. For example, the second transistor T2 may be a TFT having a second conductive type (or a P type), and when the second emission control signal EM2(*n*) is the gate low voltage VGL having the second voltage level, the second transistor T2 may be turned on. Also, when the second emission control signal EM2(*n*) is the gate high voltage VGH having the first voltage level, the second transistor T2 may be turned off.

Therefore, when the second emission control signal EM2 (*n*) is the gate low voltage VGL, the second transistor T2 may be turned on and may electrically connect the first driving voltage VDD line to the second node N2, and thus, the first driving voltage VDD may be supplied to the second node N2. Accordingly, the second transistor T2 may adjust the amount of current of the light emitting device ED on the basis of the data voltage Vdata.

The third transistor T3 may be connected to the first gate control line GL1, the third node N3, and a fourth node N4 connected to the anode electrode of the light emitting device ED and may be turned on or off by the first emission control signal EM1(*n*) through the first gate control line GL1. For example, the third transistor T3 may be a TFT having the second conductive type (or the P type), and when the first emission control signal EM1(*n*) is the gate low voltage VGL having the second voltage level, the third transistor T3 may be turned on. Also, when the first emission control signal EM1(*n*) is the gate high voltage VGH having the first voltage level, the third transistor T3 may be turned off.

Therefore, when the first emission control signal EM1(*n*) is the gate low voltage VGL, the third transistor T3 may be turned on and may electrically connect the third node N3 to the fourth node N4, and thus, a voltage of the third node N3 may be supplied to the fourth node N4. Accordingly, when the third transistor T3, the driving transistor DT, and the second transistor T2 are turned on, the first driving voltage VDD may be supplied to the driving transistor DT and a driving current may be supplied to the light emitting device ED, and thus, the light emitting device ED may emit light.

The fourth transistor T4 may be connected to the first gate control line GL1, the fourth node N4, and the initialization voltage VINI line and may be turned on or off by the first emission control signal EM1(*n*) through the first gate control line GL1. For example, the fourth transistor T4 may be a TFT having the first conductive type (or the N type), and when the first emission control signal EM1(*n*) is the gate high voltage VGH having the first voltage level, the fourth transistor T4 may be turned on. Also, when the first emission control signal EM1(*n*) is the gate low voltage VGL having the second voltage level which is lower than the first voltage level, the fourth transistor T4 may be turned off.

Therefore, when the first emission control signal EM1(*n*) is the gate high voltage VGH, the fourth transistor T4 may be turned on and may electrically connect the initialization voltage VINI line to the fourth node N4, and thus, may transfer the initialization voltage VINI to the fourth node N4 to initialize the data voltage Vdata applied to the light emitting device ED.

The fifth transistor T5 may be connected to the third gate control line GL3, the third node N3, and the data line DL and may be turned on or off by the scan signal Scan(n) through the third gate control line GL3. For example, the fifth transistor T5 may be a TFT having the second conductive type (or the P type), and when the scan signal Scan(n) is the gate low voltage VGL having the second voltage level, the fifth transistor T5 may be turned on. Also, when the scan signal Scan(n) is the gate high voltage VGH having the first voltage level, the fifth transistor T5 may be turned off.

Therefore, when the scan signal Scan(n) is the gate low voltage VGL, the fifth transistor T5 may be turned on and may electrically connect the data line DL to the third node N3, and thus, the data voltage Vdata may be supplied to the third node N3.

The capacitor C may be a storage capacitor C which stores a voltage applied to the first node N1 connected to a gate electrode of the driving transistor DT and may be disposed between the second node N1 and the fourth node N4 connected to the anode electrode of the light emitting device ED. The capacitor C may be connected to the first node N1 and the fourth node N4 and may store a difference voltage between a voltage at the gate electrode of the driving transistor DT and a voltage supplied to the anode electrode of the light emitting device ED.

The pixel circuit according to an embodiment of the present disclosure may be configured with a multi-type transistor where semiconductor layers included in the driving transistor DT and the first to fifth transistors T1 to T5 include different materials.

For example, in a pixel circuit including the multi-type transistor, a TFT including a semiconductor layer including crystalline silicon may include a low temperature polysilicon (LTPS) TFT including LTPS, and a TFT including a semiconductor layer including oxide may include an oxide semiconductor TFT including low temperature polycrystalline oxide (LTPO).

In the pixel circuit according to an embodiment of the present disclosure, the driving transistor DT and the first and fourth transistors T1 and T4 among the driving transistor DT and the first to fifth transistors T1 to T5 may each be configured as a TFT having the first conductive type (or the N type), and the second, third, and fifth transistors T2, T3, and T5 may each be configured as a TFT having the second conductive type (or the P type). For example, the driving transistor DT may be configured as an oxide semiconductor TFT having the first conductive type (or the N type), the first and fourth transistors T1 and T4 may each be configured as an LTPS TFT or an oxide semiconductor TFT having the first conductive type (or the N type), and the second, third, and fifth transistors T2, T3, and T5 may each be configured as an LTPS TFT having the second conductive type (or the P type).

A polysilicon semiconductor material may be high in electron mobility (100 $cm^2$/Vs or more, and thus, may have low power consumption and excellent reliability. An oxide semiconductor material may be low in off-current, and thus, may be short in turn-on time and may maintain a long turn-off time. Therefore, in the pixel circuit according to an embodiment of the present disclosure, the driving transistor DT and the first and fourth transistors T1 and T4 which need the precise control of a current and need a low leakage current in low frequency driving for low consumption power driving may each be implemented as an oxide semiconductor TFT having the first conductive type (or the N type), and the second, third, and fifth transistors T2, T3, and T5 which are disposed in a supply path for a current and need a fast and stable driving characteristic may each be implemented as an LTPS TFT having the second conductive type (or the P type). Also, the first and fourth transistors T1 and T4 connected to the same first gate control line GL1 may each be implemented as a TFT having the first conductive type (or the N type) and the third transistor T3 may be implemented as a TFT having the second conductive type (or the P type), and thus, a configuration of a gate driving circuit and a gate line may be minimized.

Therefore, in the display apparatus according to an embodiment of the present disclosure, TFTs having a characteristic suitable for performance needed by a transistor configuring the pixel circuit may be arranged to share a gate control signal, and thus, low frequency driving for low consumption power driving may be performed and a configuration of a gate driving circuit and a gate line may be minimized, thereby implementing a narrow bezel and improving power consumption.

Figure 3:
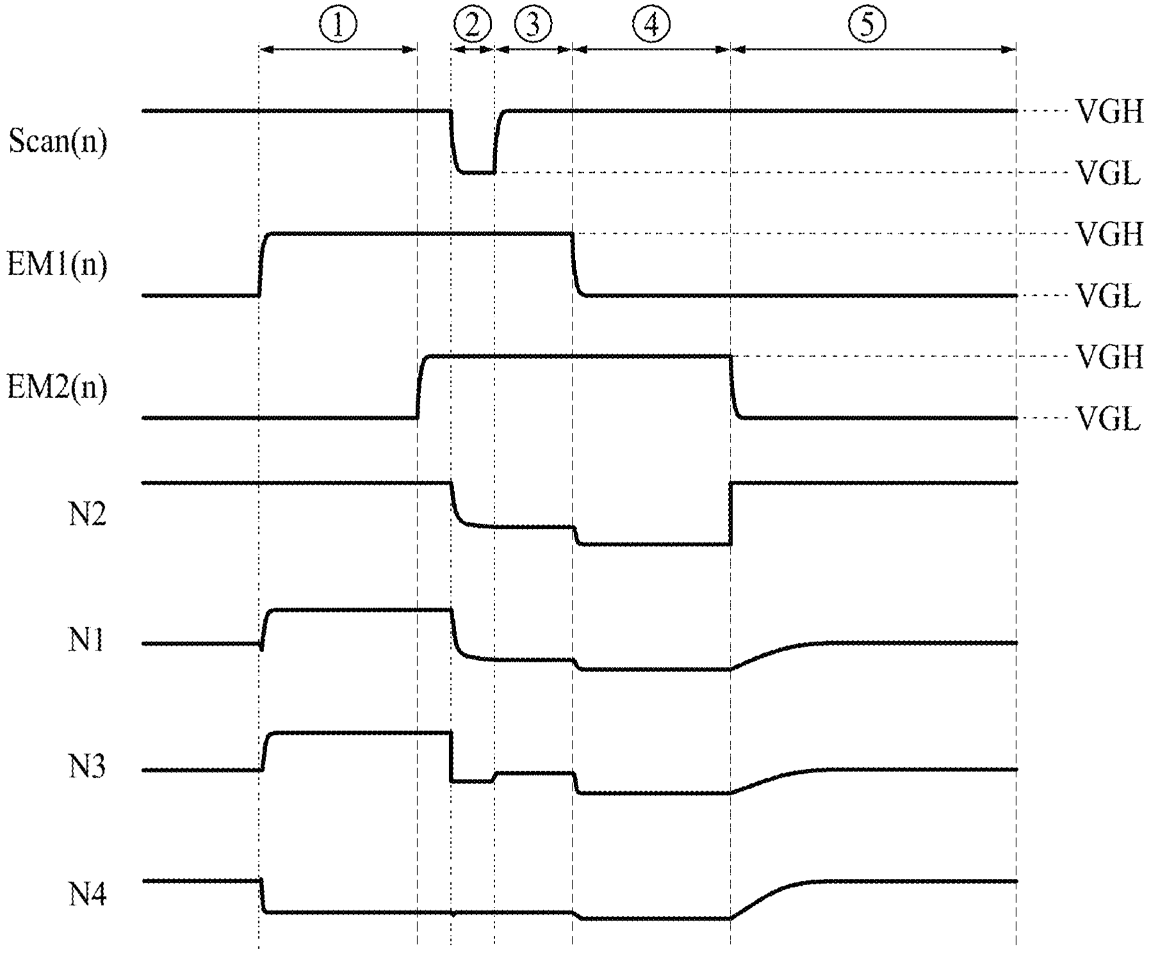
FIG. 3 is a waveform diagram of voltages of specific nodes and gate signals input to a pixel circuit according to an embodiment of the present disclosure.

FIG. 3 is a waveform diagram of voltages of specific nodes and gate signals input to a pixel circuit according to an embodiment of the present disclosure, and FIGS. 4 to 8 are diagrams for describing a driving method of a pixel circuit according to an embodiment of the present disclosure. The waveform shown in FIG. 3 relates to the pixel illustrated in FIG. 2 and is for describing a pixel provided in an $n^{th}$ horizontal line.

With reference to FIGS. 3 and 4 to 8, the pixel circuit according to an embodiment of the present disclosure may be divisionally driven in a first interval ①, a second interval ②, a third interval ③, a fourth interval ⑤, and a fifth interval ⑤. For example, each of pixels arranged in the $n^{th}$ horizontal line may be supplied with a data voltage Vdata through the first to fifth intervals ①, ②, ③, ④, and ⑤ and may emit light. A time of each of the first to fifth intervals ①, ②, ③, ④, and ⑤ may be variously changed according to embodiments.

Gate signals input to the pixel circuit may include a first emission control signal EM1(*n*) applied through a first gate control line GL1, a second emission control signal EM2(*n*) applied through a second gate control line GL2, and a scan signal Scan(n) applied through a third gate control line GL3.

The first emission control signal EM1(*n*) may have a gate high voltage VGH having a first voltage level in the first to third intervals ①, ②, and ③ and may have a gate low voltage VGL having a second voltage level differing from the first voltage level in the fourth and fifth intervals ④ and ⑤.

The second emission control signal EM2(*n*) may have the same period as that of the first emission control signal EM1(*n*), have a phase overlapping a phase of the first emission control signal EM1(*n*), have the gate high voltage VGH having the first voltage level in the second to fourth intervals ②, ③, and ④, and have the gate low voltage VGL having the second voltage level in the first and fifth intervals ① and ⑤.

The scan signal Scan(n) may have the gate high voltage VGH having the first voltage level in the first and third to fifth intervals ①, ③, ④, and ⑤ and may have the gate low voltage VGL having the second voltage level in the second interval ②. A pulse of the scan signal Scan(n) having the gate low voltage VGL may have a period of one horizontal period 1H in one frame in an interval where a phase of the first emission control signal EM1(*n*) overlaps a phase of the second emission control signal EM2(*n*). A pulse period of the scan signal Scan(n) may be variously changed according to embodiments.

Hereinafter, an operation of a pixel circuit in each driving period will be described with reference to FIGS. 4 to 8.

Figure 4:
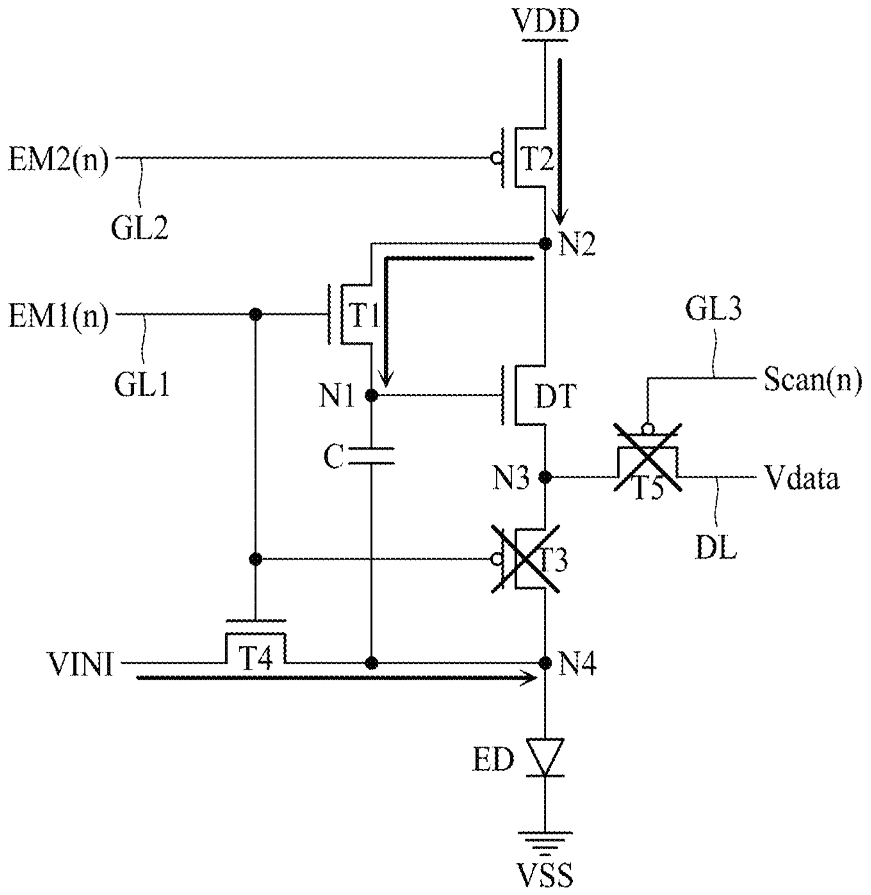
FIGS. 4 to 8 are diagrams for describing a driving method of a pixel circuit according to an embodiment of the present disclosure.

First, at a time at which the first interval ① starts, the first emission control signal EM1(*n*) may rise and may have the gate high voltage VGH, the second emission control signal EM2(*n*) may maintain the gate low voltage VGL, and the scan signal Scan(n) may maintain the gate high voltage VGH. As illustrated in FIG. 4, during the first interval ①, a first transistor T1 and a fourth transistor T4 may be turned on and a third transistor T3 may be turned off based on the gate high voltage VGH of the first emission control signal EM1(*n*), a second transistor T2 may be turned on based on the gate low voltage VGL of the second emission control signal EM2(*n*), and a fifth transistor T5 may be turned off based on the gate high voltage VGH of the scan signal Scan(n).

Therefore, an initialization voltage VINI may be supplied to a fourth node N4 through the fourth transistor T4, and a first driving voltage VDD applied to a second node N2 through the second transistor T2 may be supplied to a first node N1 through the first transistor T1. That is, as the initialization voltage VINI is supplied to the fourth node N4 connected to an anode electrode of a light emitting device ED, the data voltage Vdata applied to the light emitting device ED may be initialized, and the first driving voltage VDD may be supplied to the first node N1 connected to a gate electrode of a driving transistor DT.

Figure 5:
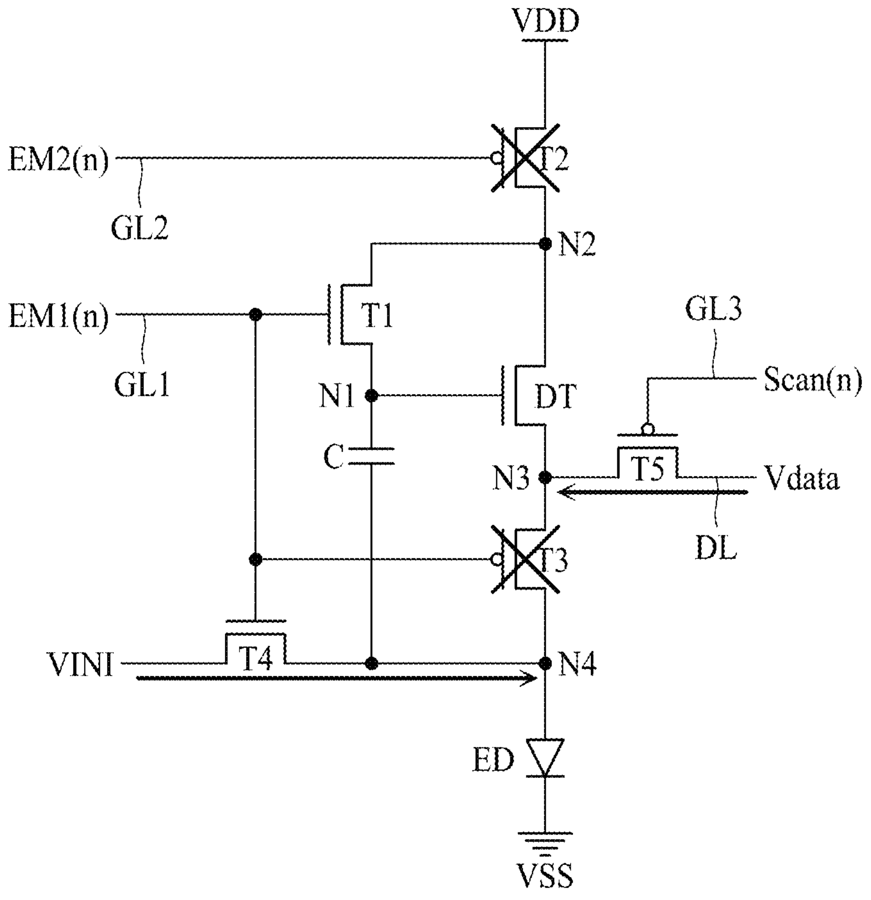

At a time at which the second interval ② starts, the scan signal Scan(n) may fall and may have the gate low voltage VGL, the first emission control signal EM1(*n*) may maintain the gate high voltage VGH, and the second emission control signal EM2(*n*) may rise to the gate high voltage VGH and may maintain the gate high voltage VGH. At this time, the second emission control signal EM2(*n*) may first rise to the gate high voltage VGH before the second interval ② starts, and thus, the second emission control signal EM2(*n*) and the scan signal Scan(n) may not be mixed. A period where the second emission control signal EM2(*n*) rises first may be about one horizontal period 1H, but embodiments of the present disclosure are not limited thereto. As illustrated in FIG. 5, during the second interval ②, the first transistor T1 and the fourth transistor T4 may be turned on and the third transistor T3 may be turned off based on the gate high voltage VGH of the first emission control signal EM1(*n*), the second transistor T2 may be turned off based on the gate high voltage VGH of the second emission control signal EM2(*n*), and the fifth transistor T5 may be turned on based on the gate low voltage VGL of the scan signal Scan(n).

Therefore, the data voltage Vdata may be supplied to the third node N3 through the fifth transistor T5. Also, as the second transistor T2 is turned off and the first transistor T1 is turned on, the first node N1 and the second node N2 of the driving transistor DT may be connected to each other, and thus, a gate-source voltage Vgs of the driving transistor DT may be sampled to a threshold voltage Vth of the driving transistor DT through a diode-connection. Also, as the fourth transistor T4 is turned on, the initialization voltage VINI may be supplied to the fourth node N4, and a difference voltage "Vdata+Vth−VINI" between the initialization voltage VINI and a sum of the data voltage Vdata and the threshold voltage Vth of the driving transistor DT may be stored in a capacitor C. Therefore, during the second interval ②, a voltage of each of the first node N1 and the second node N2 may converge to a voltage which is the sum of the data voltage Vdata and the threshold voltage Vth of the driving transistor DT, a voltage of the third node N3 may be the data voltage Vdata, and a voltage of the fourth node N4 may be the initialization voltage VINI.

Figure 6:
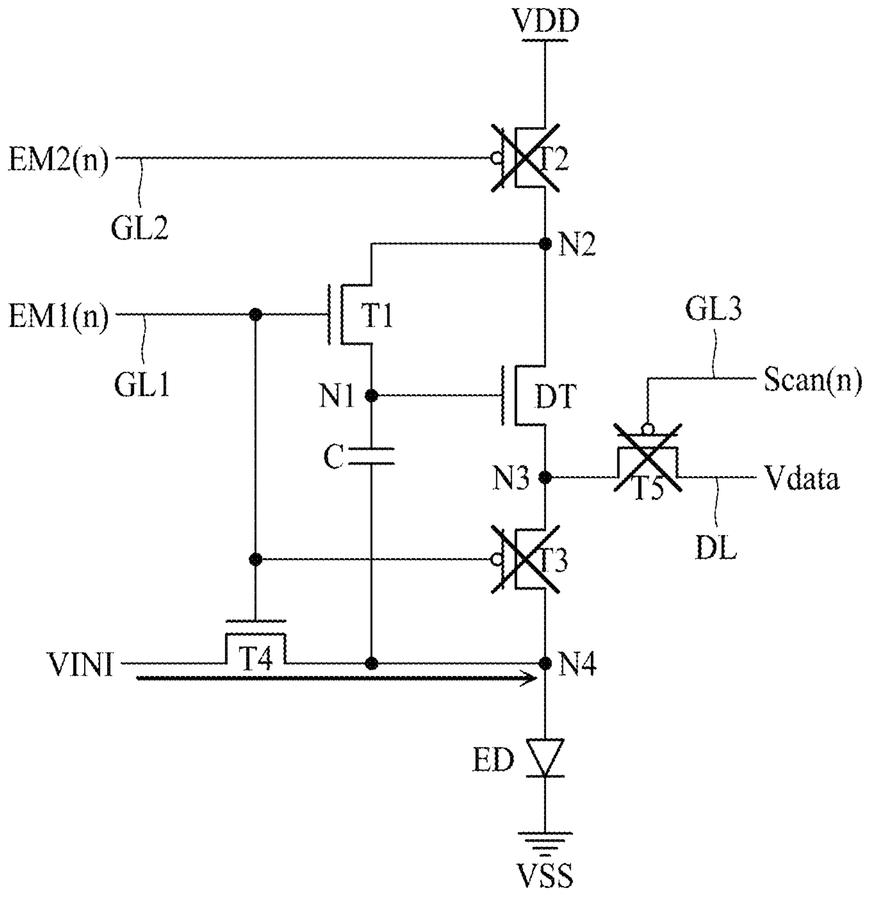

At a time at which the third interval ③ starts, the scan signal Scan(n) may rise and may have the gate high voltage VGH, the first emission control signal EM1(*n*) may maintain the gate high voltage VGH, and the second emission control signal EM2(*n*) may maintain the gate high voltage VGH. As illustrated in FIG. 6, during the third interval ③, the first transistor T1 and the fourth transistor T4 may be turned on and the third transistor T3 may be turned off based on the gate high voltage VGH of the first emission control signal EM1(*n*), the second transistor T2 may be turned off based on the gate high voltage VGH of the second emission control signal EM2(*n*), and the fifth transistor T5 may be turned off based on the gate high voltage VGH of the scan signal Scan(n).

Therefore, as the second transistor T2, the third transistor T3, and the fifth transistor T5 are turned off, each of the first node N1, the second node N2, the third node N3, and the fourth node N4 sampled or applied may be floated in the second interval ②, and a voltage of each node may be maintained.

Figure 7:
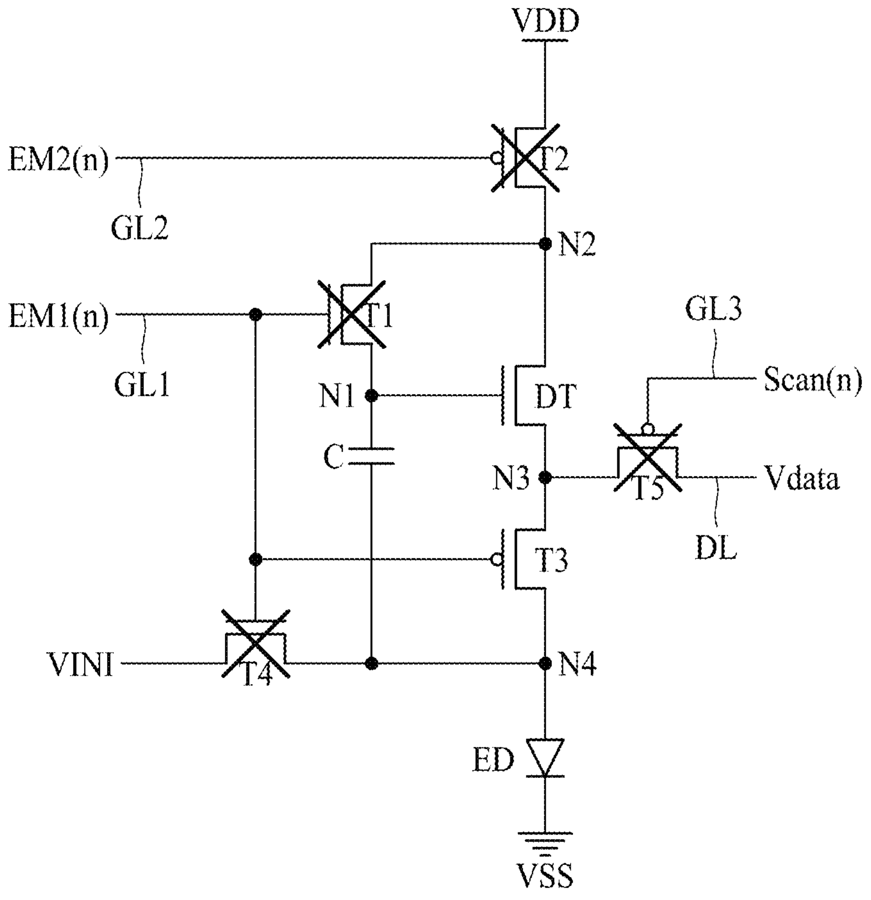

At a time at which the fourth interval ④ starts, the first emission control signal EM1(*n*) may fall and may have the gate low voltage VGL, the second emission control signal EM2(*n*) may maintain the gate high voltage VGH, and the scan signal Scan(n) may maintain the gate high voltage VGH. As illustrated in FIG. 7, during the fourth period ④, only the third transistor T3 may be turned on, and the first, second, fourth, and fifth transistors T1, T2, T4, and T5 may be turned off. Accordingly, the third transistor T3 may be turned on and may be connected to the third node N3 and the fourth node N4, and the data voltage Vdata held by the third node N3 may be supplied to the fourth node N4.

Figure 8:
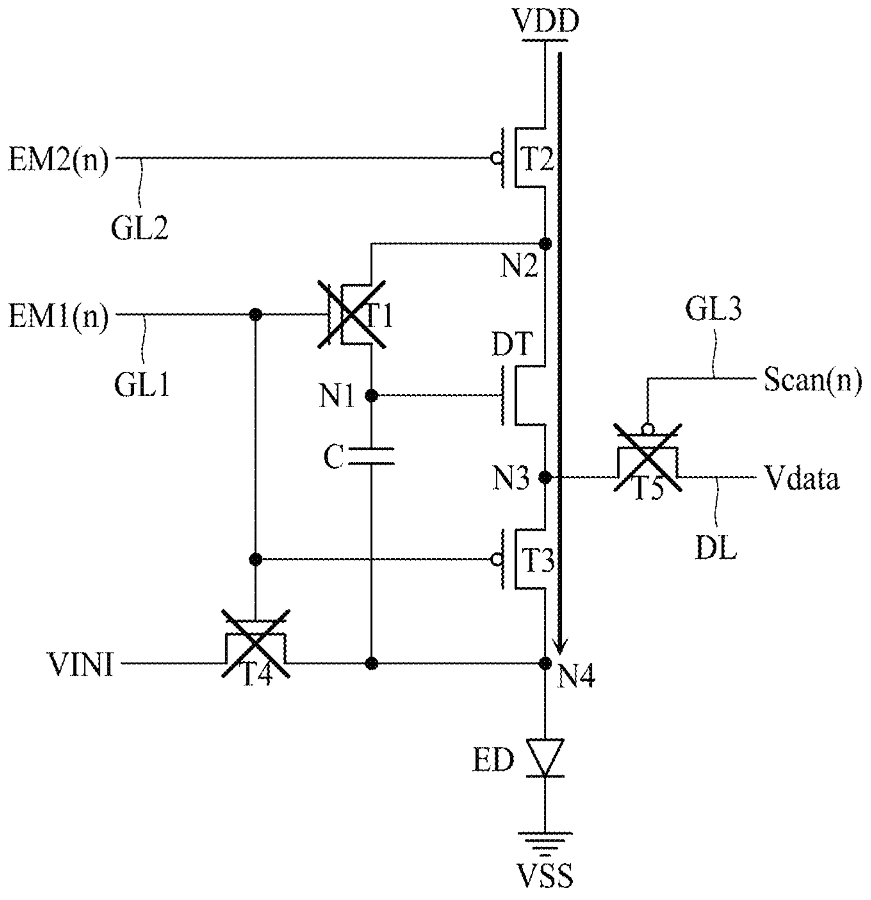

At a time at which the fifth interval ⑤ starts, the second emission control signal EM2(*n*) may fall and may have the gate low voltage VGL, the first emission control signal EM1(*n*) may maintain the gate low voltage VGL, and the scan signal Scan(n) may maintain the gate high voltage VGH. As illustrated in FIG. 8, during the fifth interval ⑤, the first, fourth, and fifth transistors T1, T4, and T5 may be turned off, and the second and third transistors T2 and T3 may be turned on. Also, the driving transistor DT may be turned on by a sum voltage of the threshold voltage Vth of the driving transistor DT and the data voltage Vdata stored in the first node N1, and thus, a path through which a driving current flows up to the light emitting device ED from the first driving voltage VDD line may be formed. That is, the driving current may flow to the light emitting device ED through the driving transistor DT, the second transistor T2, and the third transistor T3 turned on during the fifth interval ⑤. Also, in the fifth interval ⑤, the gate-source voltage Vgs of the driving transistor DT may be referred to as the data voltage Vdata and the threshold voltage Vth of the driving transistor DT may be compensated for, and thus, a level of the driving current may be adjusted based on a level of the data voltage Vdata of the driving transistor DT and the light emitting device ED may emit light with the driving current, thereby increasing luminance.

Figure 9:
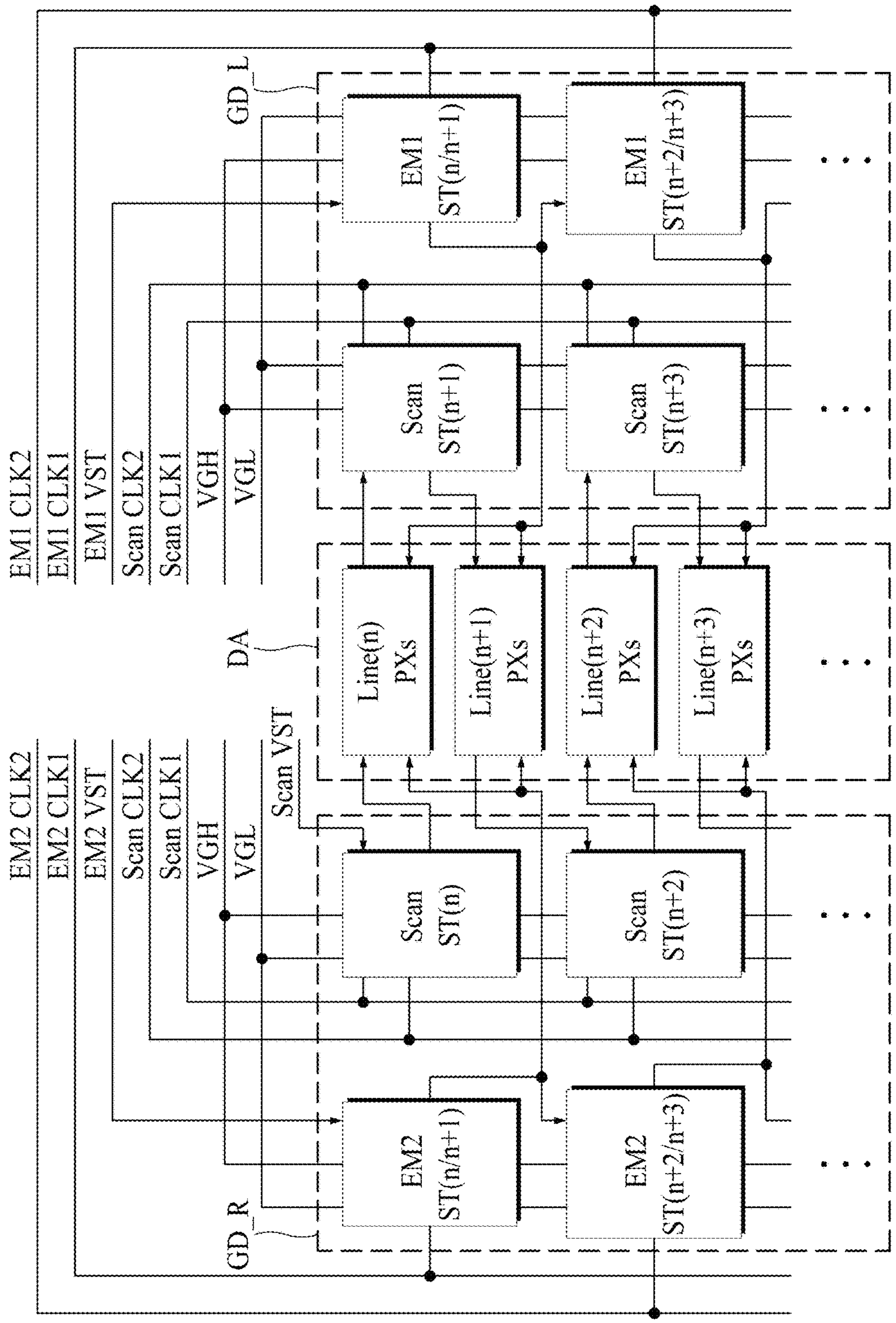
FIG. 9 is a block diagram illustrating a portion of a gate driving circuit according to an embodiment of the present disclosure.

FIG. 9 is a block diagram illustrating a portion of a gate driving circuit according to an embodiment of the present disclosure. The gate driving circuit illustrated in FIG. 9 represents a portion of the gate driving circuit GD illustrated in FIG. 1 and is for describing stages of a gate driving circuit corresponding to pixels arranged in $n^{th}$ to $n+3^{th}$ horizontal lines among pixels arranged in a display panel 110.

With reference to FIG. 9 in conjunction with FIG. 1, a gate driving circuit GD according to an embodiment of the present disclosure may include a plurality of gate signal generating circuits including stages ST corresponding to pixels PXs arranged in each horizontal line. For example, the gate driving circuit GD may include a plurality of first emission control driving circuits EM1 ST(n/n+1) and EM1 ST(n+2/n+3) which output a plurality of first emission control signals EM1, a plurality of second emission control driving circuits EM2 ST(n/n+1) and EM2 ST(n+2/n+3) which output a plurality of second emission control signals EM2, and a plurality of scan driving circuits Scan ST(n), Scan ST(n+1), Scan ST(n+2), and Scan ST(n+3) which output a plurality of scan signals Scan.

As illustrated in FIG. 9, the gate driving circuit GD may be divisionally disposed in a left non-display area NDA and a right non-display area NDA divided with respect to a display area DA of a display panel 110. For example, the gate driving circuit GD may include a first gate driving circuit GD_R disposed in the left non-display area NDA and a second gate driving circuit GD_L disposed in the right non-display area NDA.

The first gate driving circuit GD_R and the second gate driving circuit GD_L may be configured to output gate signals having different timings and may be circuits having the same structure or may be different circuits which output different gate signals.

Each of the first gate driving circuit GD_R and the second gate driving circuit GD_L may include the plurality of first emission control driving circuits EM1 ST(n/n+1) and EM1 ST(n+2/n+3), the plurality of second emission control driving circuits EM2 ST(n/n+1) and EM2 ST(n+2/n+3), and the plurality of scan driving circuits Scan ST(n), Scan ST(n+1), Scan ST(n+2), and Scan ST(n+3). For example, the first gate driving circuit GD_R may include the second emission control driving circuits EM2 ST(n/n+1) and EM2 ST(n+2/n+3) and some scan driving circuits Scan ST(n) and Scan ST(n+2), and the second gate driving circuit GD_L may include the first emission control driving circuits EM1 ST(n/n+1) and EM1 ST(n+2/n+3) and some scan driving circuits Scan ST(n+1) and Scan ST(n+3).

The first emission control driving circuits EM1 ST(n/n+1) and EM1 ST(n+2/n+3) may be disposed in the right non-display area and may have a dependently connected structure, and moreover, each of the first emission control driving circuits EM1 ST(n/n+1) and EM1 ST(n+2/n+3) may receive an output signal of at least one previous stage or next stage as an input signal. The first emission control driving circuits EM1 ST(n/n+1) and EM1 ST(n+2/n+3) may share clock signals EM1 CLK1 and EM1 CLK2 and driving voltages VGH and VGL, and a start signal EM1 VST may be applied to the first emission control driving circuits EM1 ST(n/n+1) of a previous stage. Each of the first emission control driving circuits EM1 ST(n/n+1) and EM1 ST(n+2/n+3) may supply the first emission control signal shared by pixels arranged in horizontal lines vertically adjacent to each other. For example, the first emission control driving circuit EM1 ST(n/n+1) may supply the first emission control signal to pixels Line(n) PXs arranged in the $n^{th}$ horizontal line and pixels Line(n+1) PXs arranged in the $n+1^{th}$ horizontal line, and the other first emission control driving circuit EM1 ST(n+2/n+3) may supply the first emission control signal to pixels Line(n+2) PXs arranged in the $n+2^{th}$ horizontal line and pixels Line(n+3) PXs arranged in the $n+3^{th}$ horizontal line. That is, each of the first emission control driving circuits EM1 ST(n/n+1) and EM1 ST(n+2/n+3) may be configured to provide the first emission control signal shared by pixels arranged in two adjacent horizontal lines, and thus, may be designed in a structure where a width of each of circuit stages in a horizontal direction is less than that of each circuit stage in a vertical direction, thereby reducing a bezel area of a display panel.

The second emission control driving circuits EM2 ST(n/n+1) and EM2 ST(n+2/n+3) may be disposed in the left non-display area and may have a dependently connected structure, and moreover, each of the second emission control driving circuits EM2 ST(n/n+1) and EM2 ST(n+2/n+3) may receive an output signal of at least one previous stage or next stage as an input signal. The second emission control driving circuits EM2 ST(n/n+1) and EM2 ST(n+2/n+3) may share clock signals EM2 CLK1 and EM2 CLK2 and the driving voltages VGH and VGL, and a start signal EM2 VST may be applied to the second emission control driving circuits EM2 ST(n/n+1) of a previous stage. Each of the second emission control driving circuits EM2 ST(n/n+1) and EM2 ST(n+2/n+3) may supply the second emission control signal shared by pixels arranged in horizontal lines vertically adjacent to each other. For example, the second emission control driving circuit EM2 ST(n/n+1) may supply the second emission control signal to the pixels Line(n) PXs arranged in the $n^{th}$ horizontal line and the pixels Line(n+1) PXs arranged in the $n+1^{th}$ horizontal line, and the other second emission control driving circuit EM2 ST(n+2/n+3) may supply the second emission control signal to the pixels Line(n+2) PXs arranged in the $n+2^{th}$ horizontal line and the pixels Line(n+3) PXs arranged in the $n+3^{th}$ horizontal line. That is, each of the second emission control driving circuits EM2 ST(n/n+1) and EM2 ST(n+2/n+3) may be configured to provide the first emission control signal shared by pixels arranged in two adjacent horizontal lines, and thus, may be designed in a structure where a width of each of circuit stages in a horizontal direction is less than that of each circuit stage in a vertical direction, thereby reducing a bezel area of a display panel.

The scan driving circuits Scan ST(n), Scan ST(n+1), Scan ST(n+2), and Scan ST(n+3) may be divisionally disposed in the left non-display area and the right non-display area and may have a dependently connected structure in each area, and moreover, each of the scan driving circuits may receive an output signal of at least one previous stage or next stage as an input signal. The scan driving circuits Scan ST(n), Scan ST(n+1), Scan ST(n+2), and Scan ST(n+3) may share clock signals Scan CLK1 and Scan CLK2 and the driving voltages VGH and VGL, and a start signal Scan VST may be applied to the scan driving circuit Scan ST(n) of a previous stage. The scan driving circuits Scan ST(n), Scan ST(n+1), Scan ST(n+2), and Scan ST(n+3) may sequentially supply a scan signal to pixels arranged in each horizontal line. The scan driving circuits Scan ST(n), Scan ST(n+1), Scan ST(n+2), and Scan ST(n+3) may be alternately arranged in a left area and a right area. For example, the scan driving circuit Scan ST(n) corresponding to the pixels Line(n) PXs arranged in the $n^{th}$ horizontal line may be disposed in the left area, the scan driving circuit Scan ST(n+1) corresponding to the pixels Line(n+1) PXs arranged in the $n+1^{th}$ horizontal line may be disposed in the right area, the scan driving circuit Scan ST(n+2) corresponding to the pixels Line(n+2) PXs arranged in the $n+2^{th}$ horizontal line may be disposed in the left area, and the scan driving circuit Scan ST(n+3) corresponding to the pixels Line(n+3) PXs arranged in the $n+3^{th}$ horizontal line may be disposed in the right area. That is, the scan driving circuits Scan ST(n), Scan ST(n+1), Scan ST(n+2), and Scan ST(n+3) may be divisionally disposed in the left non-display area and the right non-display area, and thus, may be designed in a structure where a width of each of circuit stages in a horizontal direction is less than that of each circuit stage in a vertical direction, thereby reducing a bezel area of a display panel.

Figure 10:
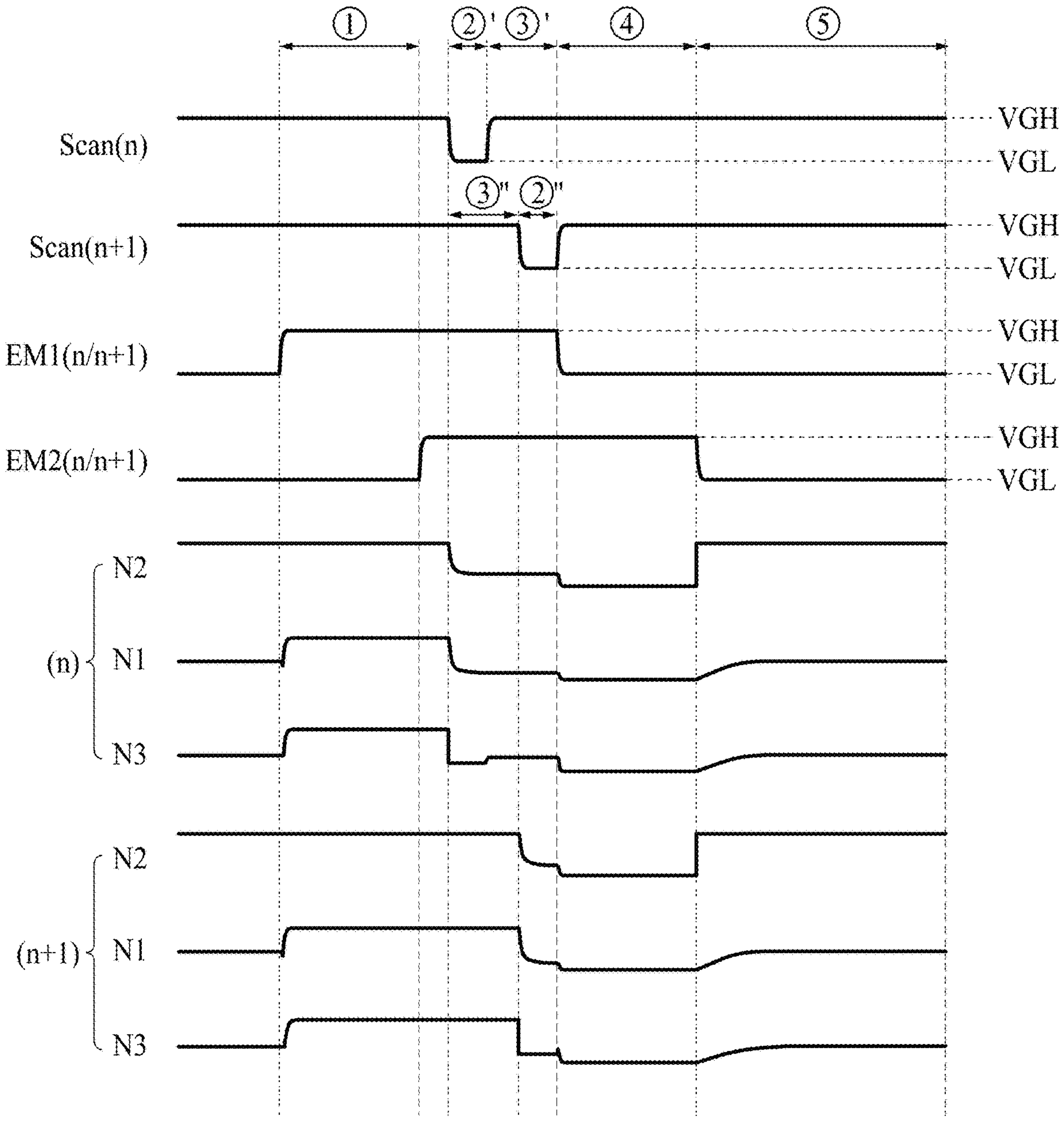
FIG. 10 is a waveform diagram of voltages of specific nodes and gate signals input to a pixel circuit of each of vertically adjacent pixels according to an embodiment of the present disclosure.

FIG. 10 is a waveform diagram of voltages of specific nodes and gate signals input to a pixel circuit of each of vertically adjacent pixels according to an embodiment of the present disclosure. The waveform shown in FIG. 10 relates to pixels vertically adjacent to each other and is for describing a pixel provided in an $n^{th}$ horizontal line and a pixel provided in an $n+1^{th}$ horizontal line.

With reference to FIG. 10, a pixel circuit of each of vertically adjacent pixels according to an embodiment of the present disclosure may be divisionally driven in a first interval ①, a second interval ②' and ②", a third interval ③', and ③", a fourth interval ④, and a fifth interval ⑤. For example, each of pixels arranged in the $n^{th}$ horizontal line may be supplied with a data voltage Vdata through the first to fifth intervals ①, ②', ③', ④, and ⑤ and may emit light, and each of pixels arranged in the $n+1^{th}$ horizontal line may be supplied with the data voltage Vdata through the first to fifth intervals ①, ②", ③", ④, and ⑤ and may emit light. Each of an $n^{th}$ pixel and an $n+1^{th}$ pixel may be identically driven in the first interval ①, the fourth interval ④, and the fifth interval ⑤ among the first interval ①, the second interval ②' and ② ", the third interval ③' and ③", the fourth interval ④, and the fifth interval ⑤ and may be differently driven in the second interval ②' and ②" and the third interval ③' and ③". For example, comparing with the second interval ②' and the third interval ③ ' of the $n^{th}$ pixel, the second interval ②" and the third interval ③" of the $n+1^{th}$ pixel may be driven in a reverse order. That is, the $n^{th}$ pixel may be first driven in the second interval ②' and may be driven in the third interval ③' subsequently, and the $n+1^{th}$ pixel may be first driven in the third interval ③" and may be driven in the second interval ②" subsequently. A time of the first to fifth intervals ①, ②', ③', ④, and ⑤ of the $n^{th}$ pixel and the first to fifth intervals ①, ②", ③", ④, and ⑤ of the $n+1^{th}$ pixel may be variously changed according to embodiments.

Gate signals input to pixel circuits of the $n^{th}$ pixel and the $n+1^{th}$ pixel vertically adjacent to each other may include a first emission control signal EM1(*n*/*n*+1) applied through a first gate control line GL1, a second emission control signal EM2(*n*/*n*+1) applied through a second gate control line GL2, and a scan signal Scan(n) and Scan(n+1) applied through a third gate control line GL3.

The first emission control signal EM1(*n*/*n*+1) may be shared by the $n^{th}$ pixel and the $n+1^{th}$ pixel and applied. With respect to a driving interval of the $n^{th}$ pixel, the first emission control signal EM1(*n*/*n*+1) may have a gate high voltage VGH having a first voltage level in the first to third intervals ①, ②, and ③ ' with respect to a driving interval of the $n^{th}$ pixel, and may have a gate low voltage VGL having a second voltage level differing from the first voltage level in the fourth and fifth intervals ④ and ⑤. Also, with respect to a driving interval of the $n+1^{th}$ pixel, the first emission control signal EM1(*n*/*n*+1) may have the gate high voltage VGH having the first voltage level in the first, third, and second intervals ①, ③", and ②" and may have the gate low voltage VGL having the second voltage level differing from the first voltage level in the fourth and fifth intervals ④ and ⑤.

The second emission control signal EM2(*n*/*n*+1) may be shared by the $n^{th}$ pixel and the $n+1^{th}$ pixel and applied and may have the same period as that of the first emission control signal EM1(*n*/*n*+1) and a phase overlapping a phase of the first emission control signal EM1(*n*/*n*+1), and moreover, with respect to a driving interval of the $n^{th}$ pixel, the second emission control signal EM2(*n*/*n*+1) may have the gate high voltage VGH having the first voltage level in the second to fourth intervals ②', ③', and ④ and may have the gate low voltage VGL having the second voltage level in the first and fifth intervals ① and ⑤. Also, with respect to a driving interval of the $n+1^{th}$ pixel, the second emission control signal EM2(*n*/*n*+1) may have the gate high voltage VGH having the first voltage level in the third, second, and fourth intervals ③", ②", and ④ and may have the gate low voltage VGL having the second voltage level in the first and fifth intervals ① and ⑤.

The scan signal Scan(n) and Scan(n+1) may include an $n^{th}$ scan signal Scan(n) corresponding to the $n^{th}$ pixel and an $n+1^{th}$ scan signal Scan(n+1) corresponding to the $n+1^{th}$ pixel. The $n^{th}$ scan signal Scan(n) and the $n+1^{th}$ scan signal Scan(n+1) may not overlap each other in an interval where the first emission control signal EM1(*n*/*n*+1) and the second emission control signal EM2(*n*/*n*+1) overlap each other in the gate high voltage VGH. The $n^{th}$ scan signal Scan(n) may have the gate high voltage VGH having the first voltage level in first and third to fifth intervals ①, ③', ④, and ⑤ of the $n^{th}$ pixel and may have the gate low voltage VGL having the second voltage level in the second interval ②'. Also, the $n+1^{th}$ scan signal Scan(n+1) may have the gate high voltage VGH having the first voltage level in first and third to fifth intervals ①, ③", ④, and ⑤ of the $n+1^{th}$ pixel and may have the gate low voltage VGL having the second voltage level in the second interval ②".

Therefore, the second interval ②' and ②" and the third interval ③' and ③" of each of the $n^{th}$ pixel and the $n+1^{th}$ pixel may overlap an interval where the first emission control signal EM1(*n*/*n*+1) and the second emission control signal EM2(*n*/*n*+1) overlap each other in the gate high voltage VGH having the first voltage level. Moreover, the second interval ②' and ②" of each of the $n^{th}$ pixel and the $n+1^{th}$ pixel may be an interval where each of the scan signals Scan(n) and Scan(n+1) has the gate low voltage VGL having the second voltage level in an interval where the first emission control signal EM1(*n*/*n*+1) and the second emission control signal EM2(*n*/*n*+1) overlap each other in the gate high voltage VGH having the first voltage level, and the third interval ③' and ③" of each of the $n^{th}$ pixel and the $n+1^{th}$ pixel may be an interval except the second interval ②' and ②" in an interval where the first emission control signal EM1(*n*/*n*+1) and the second emission control signal EM2(*n*/*n*+1) overlap each other in the gate high voltage VGH having the first voltage level.

Hereinafter, an operation of a pixel circuit in a driving interval of each of an $n^{th}$ pixel and an $n+1^{th}$ pixel will be described with reference to FIGS. 4 to 8. An operation of the pixel circuit of the $n^{th}$ pixel may be the same as description given above with reference to FIG. 3, and thus, repeated descriptions are omitted and only an operation of the pixel circuit of the $n+1^{th}$ pixel will be described below.

First, at a time at which the first interval ① of the $n+1^{th}$ pixel starts, the first emission control signal EM1(*n*/*n*+1) may rise and may have the gate high voltage VGH, the second emission control signal EM2(*n*/*n*+1) may maintain the gate low voltage VGL, and the scan signal Scan(n+1) may maintain the gate high voltage VGH. As illustrated in FIG. 4, during the first interval ①, a first transistor T1 and a fourth transistor T4 may be turned on and a third transistor T3 may be turned off based on the gate high voltage VGH of the first emission control signal EM1(n/n+1), a second transistor T2 may be turned on based on the gate low voltage VGL of the second emission control signal EM2(n/n+1), and a fifth transistor T5 may be turned off based on the gate high voltage VGH of the scan signal Scan(n)+1.

Therefore, an initialization voltage VINI may be supplied to a fourth node N4 through the fourth transistor T4, and a first driving voltage VDD applied to a second node N2 through the second transistor T2 may be supplied to a first node N1 through the first transistor T1. That is, as the initialization voltage VINI is supplied to the fourth node N4 connected to an anode electrode of a light emitting device ED, the data voltage Vdata applied to the light emitting device ED may be initialized, and the first driving voltage VDD may be supplied to the first node N1 connected to a gate electrode of a driving transistor DT.

In the n+1$^{th}$ pixel, unlike the n$^{th}$ pixel, the third interval ③" may be performed first, and the second interval ②" may be performed subsequently. During the third interval ③" of the n+1$^{th}$ pixel, the scan signal Scan(n+1) may maintain the gate high voltage VGH, the first emission control signal EM1(n/n+1) may maintain the gate high voltage VGH, and the second emission control signal EM2 (n/n+1) may rise to the gate high voltage VGH and may maintain the gate high voltage VGH. As illustrated in FIG. 6, during the third interval ③", the first transistor T1 and the fourth transistor T4 may be turned on and the third transistor T3 may be turned off based on the gate high voltage VGH of the first emission control signal EM1(n/n+1), the second transistor T2 may be turned off based on the gate high voltage VGH of the second emission control signal EM2(n/n+1), and the fifth transistor T5 may be turned off based on the gate high voltage VGH of the scan signal Scan(n+1).

Therefore, the second transistor T2, the third transistor T3, and the fifth transistor T5 may be turned off, and thus, voltages of the first node N1, the second node N2, the third node N3, and the fourth node N4 initialized in the first interval ① may be maintained.

At a time at which the second interval ② " of the n+1$^{th}$ pixel starts, the scan signal Scan(n+1) may fall and may have the gate low voltage VGL, the first emission control signal EM1(n/+1) may maintain the gate high voltage VGH, and the second emission control signal EM2(n/n+1) may maintain the gate high voltage VGH. At this time, a time at which the scan signal Scan(n+1) of the n+1$^{th}$ pixel may have a certain interval after a time at which the scan signal Scan(n) of the n$^{th}$ pixel rises again, and thus, the scan signals Scan(n) and Scan(n+1) may not be mixed. An interval between the scan signals Scan(n) and Scan(n+1) may be within about one horizontal period 1H, but embodiments of the present disclosure are not limited thereto. As illustrated in FIG. 5, during the second interval ②", the first transistor T1 and the fourth transistor T4 may be turned on and the third transistor T3 may be turned off based on the gate high voltage VGH of the first emission control signal EM1(n/n+1), the second transistor T2 may be turned off based on the gate high voltage VGH of the second emission control signal EM2(n/n+1), and the fifth transistor T5 may be turned on based on the gate low voltage VGL of the scan signal Scan(n+1).

Therefore, the data voltage Vdata may be supplied to the third node N3 through the fifth transistor T5. Also, as the second transistor T2 is turned off and the first transistor T1 is turned on, the first node N1 and the second node N2 of the driving transistor DT may be connected to each other, and thus, a gate-source voltage Vgs of the driving transistor DT may be sampled to a threshold voltage Vth of the driving transistor DT through a diode-connection. Also, as the fourth transistor T4 is turned on, the initialization voltage VINI may be supplied to the fourth node N4, and a difference voltage "Vdata+Vth-VINI" between the initialization voltage VINI and a sum of the data voltage Vdata and the threshold voltage Vth of the driving transistor DT may be stored in a capacitor C. Therefore, during the second interval ② ", a voltage of each of the first node N1 and the second node N2 may converge to a voltage which is the sum of the data voltage Vdata and the threshold voltage Vth of the driving transistor DT, a voltage of the third node N3 may be the data voltage Vdata, and a voltage of the fourth node N4 may be the initialization voltage VINI.

At a time at which the fourth interval ④ of the n+1$^{th}$ pixel starts, the scan signal Scan(n+1) may rise and may have the gate high voltage VGH, the first emission control signal EM1(n/n+1) may fall and may have the gate low voltage VGL, the second emission control signal EM2(n/n+1) may maintain the gate high voltage VGH. As illustrated in FIG. 7, during the fourth period ④, only the third transistor T3 may be turned on, and the first, second, fourth, and fifth transistors T1, T2, T4, and T5 may be turned off. Accordingly, the third transistor T3 may be turned on and may be connected to the third node N3 and the fourth node N4, and the data voltage Vdata held by the third node N3 may be supplied to the fourth node N4.

At a time at which the fifth interval ⑤ starts, the second emission control signal EM1(n/n+1) may fall and may have the gate low voltage VGL, the first emission control signal EM1(n/n+1) may maintain the gate low voltage VGL, and the scan signal Scan(n+1) may maintain the gate high voltage VGH. As illustrated in FIG. 8, during the fifth interval ⑤, the first, fourth, and fifth transistors T1, T4, and T5 may be turned off, and the second and third transistors T2 and T3 may be turned on. Also, the driving transistor DT may be turned on by a sum voltage of the threshold voltage Vth of the driving transistor DT and the data voltage Vdata stored in the first node N1, and thus, a path through which a driving current flows up to the light emitting device ED from a first driving voltage VDD line may be formed. That is, the driving current may flow to the light emitting device ED through the driving transistor DT, the second transistor T2, and the third transistor T3 turned on during the fifth interval ⑤. Also, in the fifth interval ⑤, the gate-source voltage Vgs of the driving transistor DT may be referred to as the data voltage Vdata and the threshold voltage Vth of the driving transistor DT may be compensated for, and thus, a level of the driving current may be adjusted based on a level of the data voltage Vdata of the driving transistor DT and the light emitting device ED may emit light with the driving current, thereby increasing luminance.

Therefore, in the display apparatus according to an embodiment of the present disclosure, TFTs having a characteristic suitable for performance needed by a transistor configuring a pixel circuit may be arranged, and thus, pixels arranged in vertically adjacent horizontal lines may share first and second emission control signals. Accordingly, low frequency driving for low consumption power driving may be performed and a configuration of a gate driving circuit and a gate line may be minimized, thereby implementing a narrow bezel and improving power consumption.

A pixel and a display device including the same according to an embodiment of the present disclosure may be described as follows.

A pixel according to an embodiment of the present disclosure may include a light emitting device and a pixel circuit connected to first to third gate control lines and the light emitting device, the pixel circuit including first to fourth nodes, wherein the pixel circuit includes a driving transistor connected to the first to third nodes, a first transistor connected to the first gate control line and the first and second nodes, a second transistor connected to the second gate control line, the second node, and a first driving voltage line, a third transistor connected to the first gate control line, the third node, and the fourth node, a fourth transistor connected to the first gate control line, the fourth node, and an initialization voltage line, a fifth transistor connected to the third gate control line, the third node, and a data line, and a storage capacitor provided between the first node and the fourth node.

According to some embodiments of the present disclosure, some of the driving transistor and the first to fifth transistors may have a first conductive type, and the other transistors may have a second conductive type which differs from the first conductive type.

According to some embodiments of the present disclosure, the driving transistor and the first and fourth transistors may have the first conductive type, and the second, third, and fifth transistors may have the second conductive type.

According to some embodiments of the present disclosure, some of the driving transistor and the first to fifth transistors may comprise an oxide semiconductor layer including oxide, and the other transistors may comprise a silicon semiconductor layer including crystalline silicon.

According to some embodiments of the present disclosure, the driving transistor may comprise the oxide semiconductor layer having the first conductive type.

According to some embodiments of the present disclosure, the first and fourth transistors may comprise the oxide semiconductor layer having the first conductive type.

According to some embodiments of the present disclosure, the second, third, and fifth transistors may comprise the silicon semiconductor layer having the second conductive type.

According to some embodiments of the present disclosure, the pixel circuit may be driven in first to fifth intervals, a signal of the first gate control line may have a first voltage level in the first to third intervals and may have a second voltage level differing from the first voltage level in the fourth and fifth intervals, a signal of the second gate control line may have the first voltage level in the second to fourth intervals and may have the second voltage level in the first and fifth intervals, and a signal of the third gate control line may have the first voltage level in the first interval and the third to fifth intervals and may have the second voltage level in the second interval.

According to some embodiments of the present disclosure, the first transistor may be turned on in only the first to third intervals among the first to fifth intervals, the second transistor may be turned on in only the first and fifth intervals among the first to fifth intervals, the third transistor may be turned on in only the fourth and fifth intervals among the first to fifth intervals, the fourth transistor may be turned on in only the first to third intervals among the first to fifth intervals, and the fifth transistor may be turned on in only the second interval among the first to fifth intervals.

A display apparatus according to an embodiment of the present disclosure may include a substrate including a display area, including a plurality of pixels arranged in a first direction and a second direction crossing the first direction, and a non-display area disposed near the display area and a gate driver disposed in the non-display area to supply a scan signal, a first emission control signal, and a second emission control signal to each of the plurality of pixels, wherein two pixels adjacent to each other in the second direction among the plurality of pixels share one or more of the first and second emission control signals.

According to some embodiments of the present disclosure, each of the plurality of pixels may comprise a pixel circuit including a light emitting device, a driving transistor, first to fifth transistors, and a storage capacitor, and some of the driving transistor and the first to fifth transistors may have a first conductive type, and the other transistors may have a second conductive type which differs from the first conductive type.

According to some embodiments of the present disclosure, wherein some of the driving transistor and the first to fifth transistors may comprise an oxide semiconductor layer including oxide, and the other transistors may comprise a silicon semiconductor layer including crystalline silicon.

According to some embodiments of the present disclosure, the driving transistor among the driving transistor and the first to fifth transistors may comprise the oxide semiconductor layer having the first conductive type, the first and fourth transistors may comprise the oxide semiconductor layer or the silicon semiconductor layer having the first conductive type, and the second, third, and fifth transistors may comprise the silicon semiconductor layer having the second conductive type.

According to some embodiments of the present disclosure, the gate driver may supply each of the plurality of pixels with the first emission control signal, the second emission control signal, and the scan signal having a first voltage level and a second voltage level which differs from the first voltage level, may supply the first emission control signal and the second emission control signal shared to the two pixels adjacent to each other in the second direction, and may supply different scan signals to the two pixels.

According to some embodiments of the present disclosure, the first emission control signal and the second emission control signal may overlap partially in an interval having the first voltage level, and the scan signals supplied to the two pixels may do not overlap in an interval having the second voltage level.

According to some embodiments of the present disclosure, the pixel circuit of each of the plurality of pixels may be driven in first to fifth intervals, and the pixel circuit of each of the two pixels may be identically driven in the first, fourth, and fifth intervals of the first to fifth intervals and may be differently driven in the second and third intervals.

According to some embodiments of the present disclosure, the second and third intervals of each of the two pixels may overlap an interval where the first and second emission control signals may have the first voltage level, the second interval of each of the two pixels may be an interval where each scan signal has the second voltage level in an interval where the first and second emission control signals have the first voltage level, and the third interval of each of the two pixels may be an interval other than the second interval in the interval where the first and second emission control signals have the first voltage level.

A display apparatus according to an embodiment of the present disclosure may include a substrate including a display area, including an $n^{th}$ pixel (where n is an odd number of 1 or more) and an $n+1^{th}$ pixel vertically adjacent to each other, and first and second non-display areas parallel to each other with the display area therebetween, a first gate driver configured to supply a first emission control signal to the $n^{th}$ pixel and the $n+1^{th}$ pixel in the first non-display area, and a second gate driver configured to supply a second emission control signal to the $n^{th}$ pixel and the $n+1^{th}$ pixel in the second non-display area, wherein each of the $n^{th}$ pixel and the $n+1^{th}$ pixel emits light on the basis of the first emission control signal and the second emission control signal.

According to some embodiments of the present disclosure, the first gate driver may comprise a first emission control driving circuit supplying the first emission control signal shared by the $n^{th}$ pixel and the $n+1^{th}$ pixel and an $n^{th}$ scan driving circuit supplying an $n^{th}$ scan signal to the $n^{th}$ pixel, and the second gate driver may comprise a second emission control driving circuit supplying the second emission control signal shared by the $n^{th}$ pixel and the $n+1^{th}$ pixel and an $n+1^{th}$ scan driving circuit supplying an $n+1^{th}$ scan signal to the $n+1^{th}$ pixel.

According to some embodiments of the present disclosure, the first emission control signal, the second emission control signal, the $n^{th}$ scan signal, and the $n+1^{th}$ scan signal may have a first voltage level and a second voltage level which differs from the first voltage level, the first emission control signal and the second emission control signal may overlap partially in an interval having the first voltage level, and the $n^{th}$ scan signal and the $n+1^{th}$ scan signal may have the second voltage level which does not overlap in an interval where the first emission control signal and the second emission control signal overlap in the first voltage level.

In the pixel and the display apparatus including the same according to some embodiment of the present disclosure, the number of gate control signals needed for a pixel driving circuit may be reduced by sharing a gate control signal in adjacent horizontal lines, and thus, a narrow bezel may be implemented and power consumption may decrease.

It will be apparent to those skilled in the art that various modifications and variations can be made in the pixel and the display apparatus including the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display apparatus, comprising:
- a display panel including a display area, including a plurality of pixels arranged in a first direction and a second direction crossing the first direction, and a non-display area disposed near the display area;
- a gate driver disposed in the non-display area, the gate driver comprising:
  - a scan driving circuit disposed adjacent to the display area; and
  - an emission control driving circuit disposed farther away from the display area than the scan driving circuit,
- wherein the scan driving circuit is configured to receive at least one first clock signal and to supply a scan signal to pixels arranged in at least one horizontal line parallel to the first direction among the plurality of pixels,
- wherein the emission control driving circuit is configured to receive at least one second clock signal different from the at least one first clock signal and to supply an emission control signal to pixels in one or more horizontal lines parallel to the first direction among the plurality of pixels,
- wherein each of the plurality of pixels comprises:
  - a light emitting device; and
  - a pixel circuit connected to first to third gate control lines and the light emitting device,
- wherein the pixel circuit of each of the plurality of pixels is configured to be driven in first to fifth intervals, and
- wherein the pixel circuit of each of two pixels adjacent to each other in the second direction among the plurality of pixels is configured to be identically driven in the first, fourth, and fifth intervals and to be differently driven in the second and third intervals.

2. The display apparatus of claim 1, wherein the scan driving circuit is disposed between the display area and the emission control driving circuit.

3. The display apparatus of claim 1, wherein the scan driving circuit and the emission control driving circuit share a same driving voltage.

4. The display apparatus of claim 1, wherein the emission control driving circuit is further configured to supply the emission control signal to two pixels adjacent to each other in the second direction among the plurality of pixels.

5. The display apparatus of claim 1, wherein the emission control driving circuit is further configured to supply the emission control signal to two pixels adjacent to each other in the second direction among the plurality of pixels to be shared by the two pixels.

6. The display apparatus of claim 1, wherein:
- the pixel circuit comprises a driving transistor, first to fifth transistors, and a storage capacitor, and
- at least one of the driving transistor and the first to fifth transistors has a first conductive type, and another of the driving transistor and the first to fifth transistors has a second conductive type which differs from the first conductive type.

7. The display apparatus of claim 6, wherein at least one of the driving transistor and the first to fifth transistors comprises an oxide semiconductor layer including oxide, and another of the driving transistor and the first to fifth transistors comprises a silicon semiconductor layer including crystalline silicon.

8. The display apparatus of claim 7, wherein:
- the driving transistor comprises the oxide semiconductor layer having the first conductive type,
- the first and fourth transistors comprise the oxide semiconductor layer or the silicon semiconductor layer having the first conductive type, and
- the second, third, and fifth transistors comprise the silicon semiconductor layer having the second conductive type.

9. The display apparatus of claim 1, wherein the scan signal and the emission control signal have a first voltage level and a second voltage level which differs from the first voltage level.

10. The display apparatus of claim 9, wherein:
- the second and third intervals of each of the two pixels overlap an interval in which first and second emission control signals have the first voltage level,
- the second interval of each of the two pixels is an interval in which each scan signal has the second voltage level in the interval in which the first and second emission control signals have the first voltage level, and
- the third interval of each of the two pixels is an interval other than the second interval in the interval in which the first and second emission control signals have the first voltage level.

11. The display apparatus of claim 1, wherein the pixel circuit comprises:

first to fourth nodes;

a driving transistor connected to the first to third nodes;

a first transistor connected to the first gate control line and to the first and second nodes;

a second transistor connected to the second gate control line, the second node, and a first driving voltage line;

a third transistor connected to the first gate control line, the third node, and the fourth node;

a fourth transistor connected to the first gate control line, the fourth node, and an initialization voltage line;

a fifth transistor connected to the third gate control line, the third node, and a data line; and a storage capacitor between the first node and the fourth node.

12. The display apparatus of claim 11, wherein:

a signal of the first gate control line has a first voltage level in the first to third intervals and has a second voltage level differing from the first voltage level in the fourth and fifth intervals, a signal of the second gate control line has the first voltage level in the second to fourth intervals and has the second voltage level in the first and fifth intervals, and a signal of the third gate control line has the first voltage level in the first interval and the third to fifth intervals and has the second voltage level in the second interval.

13. The display apparatus of claim 12, wherein:

the first transistor is configured to be turned on in only the first to third intervals among the first to fifth intervals;

the second transistor is configured to be turned on in only the first and fifth intervals among the first to fifth intervals;

the third transistor is configured to be turned on in only the fourth and fifth intervals among the first to fifth intervals;

the fourth transistor is configured to be turned on in only the first to third intervals among the first to fifth intervals; and the fifth transistor is configured to be turned on in only the second interval among the first to fifth intervals.

14. The display apparatus of claim 1, wherein:

the non-display area comprises a first non-display area and a second non-display area parallel to each other with the display area therebetween, and the gate driver comprises a first gate driver and a second gate driver that are symmetrical to each other with the display area therebetween.

15. The display apparatus of claim 14, wherein:

the first gate driver is disposed in the first non-display area and includes:

a first scan driving circuit connected to pixels arranged in at least one odd horizontal line among the plurality of pixels; and a first emission control driving circuit configured to supply a first emission control signal to pixels arranged in odd and even horizontal lines adjacent to each other among the plurality of pixels; and the second gate driver is disposed in the second non-display area and includes:

a second scan driving circuit connected to pixels arranged in at least one even horizontal line among the plurality of pixels; and a second emission control driving circuit configured to supply a second emission control signal different from the first emission control signal to pixels arranged in odd and even horizontal lines adjacent to each other among the plurality of pixels.

16. The display apparatus of claim 15, wherein the first scan driving circuit and the second scan driving circuit are alternately disposed in the first non-display area and the second non-display area.

17. The display apparatus of claim 15, wherein the first scan driving circuit and the second scan driving circuit are configured to be alternately driven in the at least one odd horizontal line and the at least one even horizontal line.

18. The display apparatus of claim 15, wherein:

the first emission control signal and the second emission control signal have a first voltage level and a second voltage level which differs from the first voltage level, and the first emission control signal and the second emission control signal overlap partially in an interval having the first voltage level.

19. The display apparatus of claim 18, wherein:

different scan signals output from each of the first scan driving circuit and the second scan driving circuit have the first voltage level and the second voltage level, and the different scan signals have the second voltage level which does not overlap in an interval where the first emission control signal and the second emission control signal overlap in the first voltage level.

* * * * *